US011874296B2

(12) United States Patent
Kluftinger et al.

(10) Patent No.: US 11,874,296 B2
(45) Date of Patent: Jan. 16, 2024

(54) ROTATIONAL SPEED SENSOR, FIXING DEVICE FOR A ROTATIONAL SPEED SENSOR, RECEIVING DEVICE FOR A ROTATIONAL SPEED SENSOR, SENSOR SYSTEM HAVING A RECEIVING DEVICE AND A ROTATIONAL SPEED SENSOR AND METHOD FOR THE ROTATIONALLY LOCKED POSITIONING OF A ROTATIONAL SPEED SENSOR

(71) Applicant: Knorr-Bremse Systeme Fuer Nutzfahrzeuge GmbH, Munich (DE)

(72) Inventors: Andre Kluftinger, Kleinheubach (DE); Michael Herges, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 66 days.

(21) Appl. No.: 17/595,111

(22) PCT Filed: Apr. 23, 2020

(86) PCT No.: PCT/EP2020/061288
§ 371 (c)(1),
(2) Date: Nov. 9, 2021

(87) PCT Pub. No.: WO2020/229126
PCT Pub. Date: Nov. 19, 2020

(65) Prior Publication Data
US 2022/0221483 A1 Jul. 14, 2022

(30) Foreign Application Priority Data

May 15, 2019 (DE) ...................... 10 2019 112 664.9

(51) Int. Cl.
*G01P 3/481* (2006.01)

(52) U.S. Cl.
CPC .................................... *G01P 3/481* (2013.01)

(58) Field of Classification Search
CPC ............. G01P 3/481; G01P 1/00; G01P 1/026
See application file for complete search history.

(56) References Cited

U.S. PATENT DOCUMENTS 5,121,289 A 6/1992 Gagliardi
5,975,761 A 11/1999 Ouchi et al.
(Continued)

FOREIGN PATENT DOCUMENTS

DE 102008054000 A1 5/2010
DE 102010049552 A1 4/2012
(Continued)

OTHER PUBLICATIONS

International Search Report for PCT/EP2020/061288 dated Jul. 31, 2020.

*Primary Examiner* — Jermele M Hollington
*Assistant Examiner* — Zannatul Ferdous
(74) *Attorney, Agent, or Firm* — NORTON ROSE FULBRIGHT US LLP; Gerard A. Messina

(57) ABSTRACT

A rotational speed sensor, including: a cylindrical sensor head having a measuring tip; and a tongue, which is arranged on an outer diameter of the sensor head, and which is formed to interact with a counter-contour of a fixing device as an anti-rotation lock for the rotational speed sensor. Also described are a related fixing device, a receiving device, a sensor system, and a method.

16 Claims, 10 Drawing Sheets

(56) References Cited

U.S. PATENT DOCUMENTS

| | | |
|---|---|---|
| 6,254,276 B1 | 7/2001 | Ouchi et al. |
| 2003/0033897 A1 | 2/2003 | Easton |
| 2003/0107369 A1 | 6/2003 | Ito et al. |
| 2006/0169059 A1* | 8/2006 | Kawasaki ............... G01P 1/026 |
| | | 73/862.08 |
| 2007/0163337 A1 | 7/2007 | Loscher |
| 2013/0272637 A1* | 10/2013 | Schaefer ................ G01P 1/026 |
| | | 384/448 |
| 2022/0128588 A1* | 4/2022 | Lechner ............ B29C 45/14065 |

FOREIGN PATENT DOCUMENTS

| | | |
|---|---|---|
| DE | 102017110119 A1 | 11/2018 |
| DE | 102017113604 A1 | 12/2018 |
| EP | 1284424 A2 | 2/2003 |
| JP | 3480240 B2 | 12/2003 |

* cited by examiner

A - A

A - A

A - A

A - A

B - B

ROTATIONAL SPEED SENSOR, FIXING DEVICE FOR A ROTATIONAL SPEED SENSOR, RECEIVING DEVICE FOR A ROTATIONAL SPEED SENSOR, SENSOR SYSTEM HAVING A RECEIVING DEVICE AND A ROTATIONAL SPEED SENSOR AND METHOD FOR THE ROTATIONALLY LOCKED POSITIONING OF A ROTATIONAL SPEED SENSOR

FIELD OF THE INVENTION

The present approach relates to a rotational speed sensor, a fixing device for a rotational speed sensor, a receiving device for a rotational speed sensor, a sensor system with a receiving device and a rotational speed sensor and a method for rotationally locked positioning of a rotational speed sensor.

BACKGROUND INFORMATION

German patent document DE 10 2008 054 000 B4 discusses a device for self-adjustment and a method for arranging a pulse rotational speed encoder relative to a rotor. For positionally correct installation, a contour which allows positionally correct installation is introduced either on the sensor or on a clamping sleeve.

SUMMARY OF THE INVENTION

Against this background, an object of the present approach is to create an improved rotational speed sensor, an improved fixing device for a rotational speed sensor, an improved receiving device for a rotational speed sensor, an improved sensor system with a receiving device and a rotational speed sensor and an improved method for rotationally locked positioning of a rotational speed sensor.

This object may be achieved by a rotational speed sensor, by a fixing device, by a receiving device, by a sensor system and ultimately by a method according to the main descriptions herein.

The advantages achievable with the presented approach are that stable positionally locked positioning of a rotational speed sensor is easily possible, with which an axial movement of the rotational speed sensor is optionally allowed. The movement can also be realized by a clamping sleeve, which is installed together with the rotational speed sensor.

A rotational speed sensor has a cylindrical sensor head with a measuring tip and a tongue. The tongue is arranged on an outer diameter of the sensor head and is formed to interact with a counter-contour of a fixing device as an anti-rotation device for the rotational speed sensor.

The rotational speed sensor may be an active rotational speed sensor, which can also be referred to as a pulse rotational speed encoder, for example. The sensor head of the rotational speed sensor can be formed in one piece with the measuring tip and the tongue. However, the sensor head may also have a first component in the form of a cylindrical base body and a second component, which has the measuring tip, wherein the first component and the second component are coupled to each other. The tongue may be formed in one piece with the first component or the second component. Alternatively, the tongue may be connected as a separate element to the first component or the second component. For example, the measuring tip may form a free end of the rotational speed sensor. The measuring tip may be configured to sense a rotational speed of a rotor or pole wheel, for example. For this purpose, the measuring tip may have at least one Hall sensor, which may be connected via a measurement and supply cable to provide a supply voltage. A rotational speed sensor presented here can be coupled in a rotationally locked manner by the tongue in or to the fixing device, which can be understood as a fixed machine part. The fixing device may have at least one fixing element. In this case, an axial movement of the rotational speed sensor, for example relative to the rotor or pole wheel, may still be possible. The rotational speed sensor presented here thus enables a form-fitting positionally correct installation thanks to a slightly special shape in the form of the tongue, wherein the rotational speed sensor can still be moved on one axis. The tongue, which is located directly on the sensor head, enables particularly stable form-fitting rotational locking. Thus, the tongue can also contact a surface formed directly on the axle, for example, and can fix the sensor in a rotationally locked manner. This has the advantage that both a conventional sensor and a rotationally locked sensor can be fixed in the same holder.

The tongue may extend radially away from the sensor head. For example, the tongue may extend radially away from a cylindrical section of the second component. One form of the tongue may be rectangular. This enables stable, form-fitting, rotationally locked fixing of the sensor head. Side surfaces of the tongue may be of a smooth form. The tongue may be formed without an extension or projection in the longitudinal direction of the sensor head. To prevent rotation of the rotational speed sensor, the tongue may contact the counter-contour or may touch the counter-contour. For example, the tongue may engage in or on the counter-contour as a rotational lock. As a result, a very stable anti-rotation lock can be created.

According to one embodiment, two side surfaces of the tongue may form stop surfaces for the counter-contour. The side surfaces may be two oppositely arranged and additionally or alternatively parallel side surfaces of the tongue. The two side surfaces may be arranged transverse to the longitudinal axis of the sensor head and opposite each other. This prevents the tongue from moving over the two side surfaces, whereby rotation of the rotational speed sensor is blocked.

The tongue may be located at an end of the sensor head remote from the measuring tip. This creates a way to easily realize the anti-rotation lock during installation.

It is also advantageous if an end surface of the tongue has a tongue groove as a stop surface for the counter-contour. The end surface may form an extreme free end of the tongue. For example, the end surface may be arranged transverse to the side surfaces and may connect them. The tongue groove may be recessed into the end surface as a semicircle. In such a tongue groove, only a simple fixing device with only a single fixing element such as a pin, which is inserted into the tongue groove, can be used for the anti-rotation lock to prevent lateral movement of the rotational speed sensor.

Alternatively, the end surface may be formed as a flat stop surface. Such a form can be realized cost-effectively.

A fixing device for one of the rotational speed sensors presented above has the counter-contour, which can be coupled to the tongue of the rotational speed sensor to position the rotational speed sensor with rotational locking. Here, the counter-contour and the tongue can be coupled to each other in a form-fitting manner. The fixing device may represent a fixed machine part or be rigidly fixed to a fixed machine part. In order to fix the fixing device to a fixed machine part, the fixing device may have at least one fixing element in the form of a screw, a rod, a bolt, a bearing body and additionally or alternatively a tab or may be coupled to at least one such fixing element. The fixing device may also be formed directly on the holder.

The counter-contour may, for example, have a flat surface with which the tab is in rotationally locked contact. Alternatively, the receiving groove for receiving the tongue or a projection for engaging in a tongue groove of the tongue or at least one extension can be formed as a counter-stop surface for the tongue. The receiving groove may, for example, have a rectangular cross-section to receive an essentially rectangular tongue. The receiving groove may be formed, for example, in a fixing element in the form of a bearing body. The protrusion may be, for example, a curved or angular outer surface of a rod-shaped fixing element, wherein the rod can be inserted into the tongue groove. The counter-contour may also include two of the extensions, which can act on two sides as two counter-stop surfaces for two side surfaces of the tongue. The tongue may, for example, be arranged between the two extensions to prevent lateral movement of the tongue by the two extensions in a form-fitting manner. One of the extensions or both extensions may be in the form of a rod shape.

A receiving device for one of the rotational speed sensors presented above has a receiving body for receiving at least one section of the sensor head and one of the fixing devices presented above. The receiving body may classically be a bore in the axle for receiving the sensor. Or in a further version the receiving body may also be of a hollow cylindrical, for example tubular form. The receiving body may be formed to be mounted on a vehicle, for example a truck or trailer. For example, an outer surface of the receiving body may have one or more welding tabs. Such a receiving device creates a stable and protected receiving option for rotationally locked mounting of the rotational speed sensor.

The receiving body of the receiving device and the fixing device may be formed in one piece, or the fixing device may be connected to the receiving body in a form-fitting, force-locking and additionally or alternatively firmly bonded manner. The fixing device may be screwed, clamped, glued, cast or welded to the receiving body, for example.

A sensor system has one of the receiving devices presented above and one of the rotational speed sensors presented above, wherein the tongue of the rotational speed sensor is or can be coupled to the counter-contour in a rotationally locked manner. For example, with the rotational speed sensor in a received position in the receiving body, the tongue may be coupled to the counter-contour in a rotationally locked manner. Surfaces of the tongue and the counter-contour which prevent rotation can come into contact with each other without play. In the receiving position, the rotational speed sensor can be linearly moved in the receiving body along an axis of the receiving body. The sensor system according to the invention has the advantage that both classic passive (not rotationally locked) and active (rotationally locked) rotational speed sensors can be installed in the same device.

A method for rotationally locked positioning of one of the rotational speed sensors presented above on a fixing device has an arranging step. In the arranging step, the tongue of the rotational speed sensor is arranged in or on a counter-contour of a fixing device, wherein in the arranging step the tongue is arranged in such a way that it interacts with the counter-contour, for example it grips in or on the counter-contour to position the rotational speed sensor in a rotationally locked manner.

Exemplary embodiments of the approach presented here are explained in more detail in the following description with reference to the figures.

In the following description of favorable exemplary embodiments of the present approach, the same or similar reference characters are used for the elements depicted in the various figures with the same or with a similar effect, wherein a repeated description of these elements is dispensed with.

DETAILED DESCRIPTION

Figure 1:
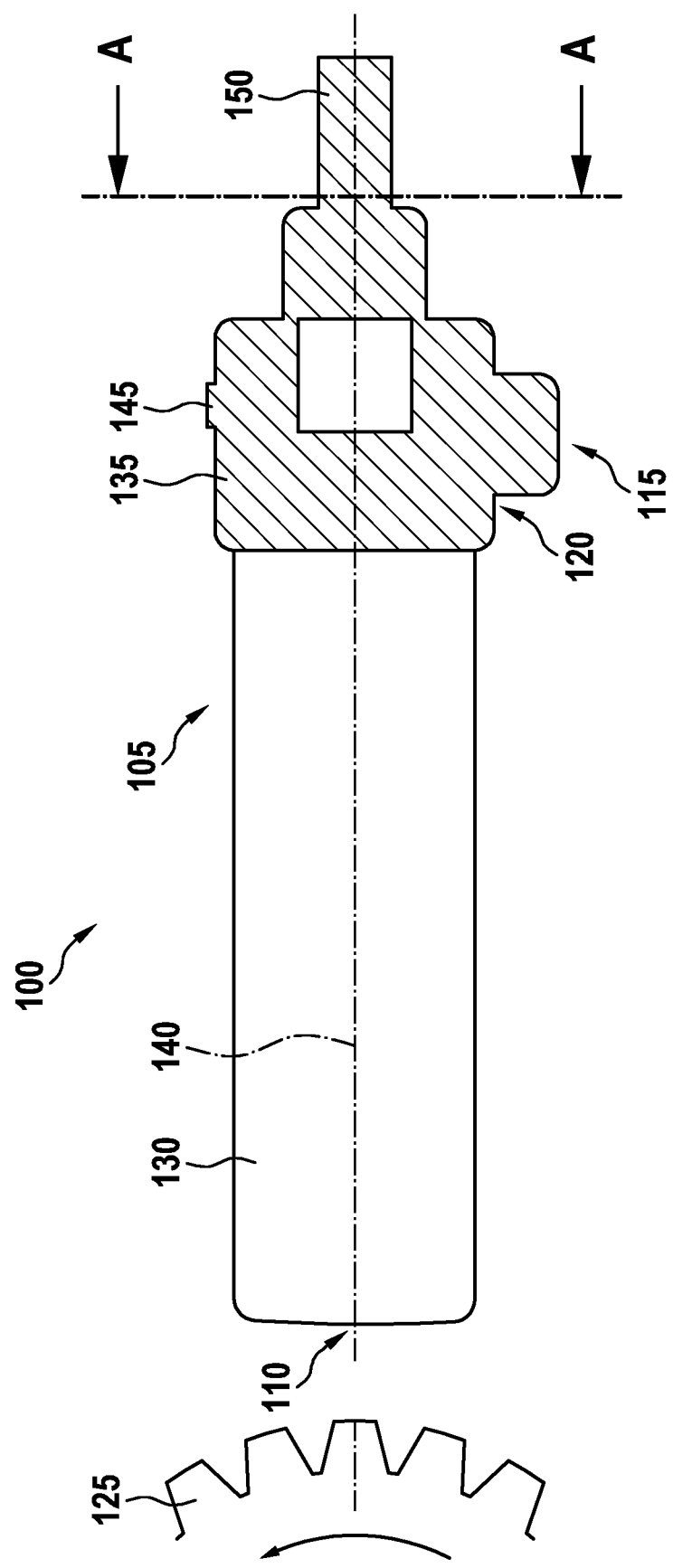
FIG. 1 shows a lateral cross-sectional representation of a rotational speed sensor according to an exemplary embodiment.

FIG. 1 shows a lateral representation of a rotational speed sensor 100 according to an exemplary embodiment.

The rotational speed sensor 100 has a cylindrical sensor head 105 with a measuring tip 110 and a tongue 115. The tongue 115 is arranged on an outer diameter 120 of the sensor head 105 and is formed in order to interact with a counter-contour of a fixing device as an anti-rotation lock for the rotational speed sensor 100, for example to grip in or on such a counter-contour.

The rotational speed sensor 100 is configured, for example, to sense a rotational speed of a rotor 125 or a pole wheel. For this purpose, the measuring tip 110, which forms a free end of the rotational speed sensor 100, is arranged facing the rotor 125 according to this exemplary embodiment. According to this exemplary embodiment, the rotational speed sensor 100 is formed as an active rotational speed sensor 100. According to this exemplary embodiment, the rotational speed sensor 100 has a first component 130, which forms a cylindrical base body of the sensor head 105. The rotor 125 is positioned opposite the rotational speed sensor 100 and in particular opposite to the measuring tip 110. The measuring tip 110 is arranged at one end of the rotational speed sensor 100 facing the rotor 125, here at the end of the first component 130 facing the rotor 125. Furthermore, the rotational speed sensor 100 has a second component 135 which forms the tongue 115 and a cable outlet 150. According to this exemplary embodiment, the first component 130 and the second component 135 are connected to each other in a rotationally locked manner and in a form-fitting, force-fitting and/or firmly bonded manner. According to an alternative exemplary embodiment, the tongue 115 is arranged on the first component 130 or the entire rotational speed sensor 100 is formed in one piece.

According to this exemplary embodiment, the tongue 115 extends radially away from the sensor head 105. Here, according to this exemplary embodiment the tongue 115 extends away from a cylindrical section of the second component 135 running towards the base body and/or perpendicular to a cylinder center axis 140 or longitudinal axis of the cylindrical sensor head 105. According to this exemplary embodiment, the tongue 115 is arranged at an end of the sensor head 105 facing away from the measuring tip 110. The tongue 115 has a rectangular cross-section.

On a side of the outer diameter 120 facing away from the tongue 115, according to this exemplary embodiment the sensor head 105 has a direction indicator 145, which is formed for to enable rotationally correct alignment of the sensor 100. The direction indicator 145 is formed as a small projection over the outer diameter 120 or is let into it, for example.

The rotational speed sensor 100 presented here realizes an interface element for the rotationally locked fixing of the active rotational speed sensor 100 due to the tongue 115. The tongue 115 can also be referred to as an "element for rotationally correct alignment". With the active rotational speed sensor 100, positionally correct installation relative to the rotor 125 is necessary, wherein the sensor 100 is movable in a holder along the cylinder center axis 140, for example by a clamping sleeve, see also FIGS. 7 to 12.

FIG. 1 shows a section axis A-A to which FIGS. 2 to 5 relate.

Figure 2:
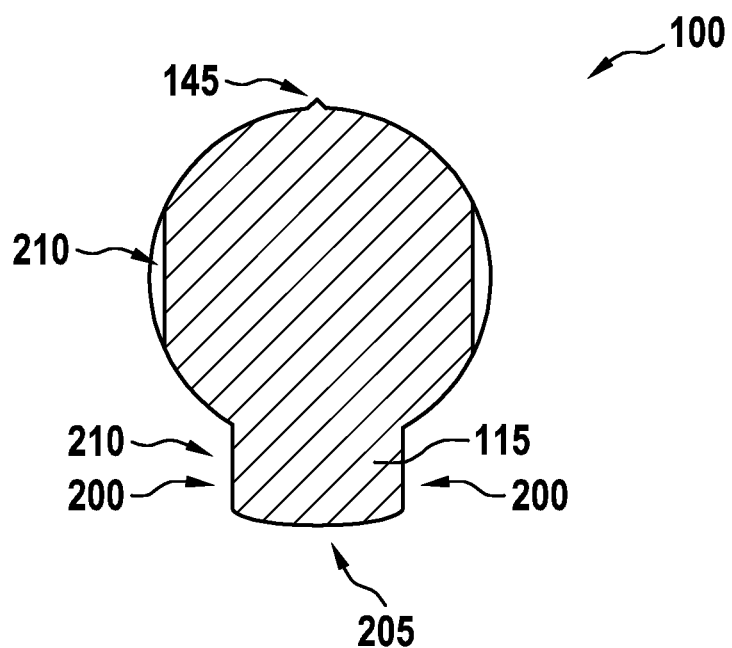
FIG. 2 shows a rear cross-sectional representation of a rotational speed sensor according to an exemplary embodiment (section A-A of FIG. 1).
Figure 3A:
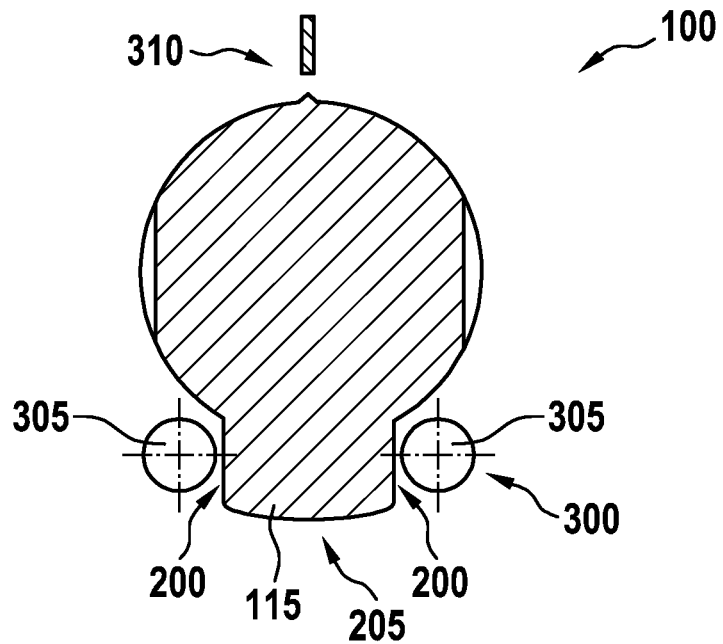
FIG. 3a and FIG. 3b each show a rear cross-sectional representation of a rotational speed sensor and a fixing device according to an exemplary embodiment.
Figure 3B:
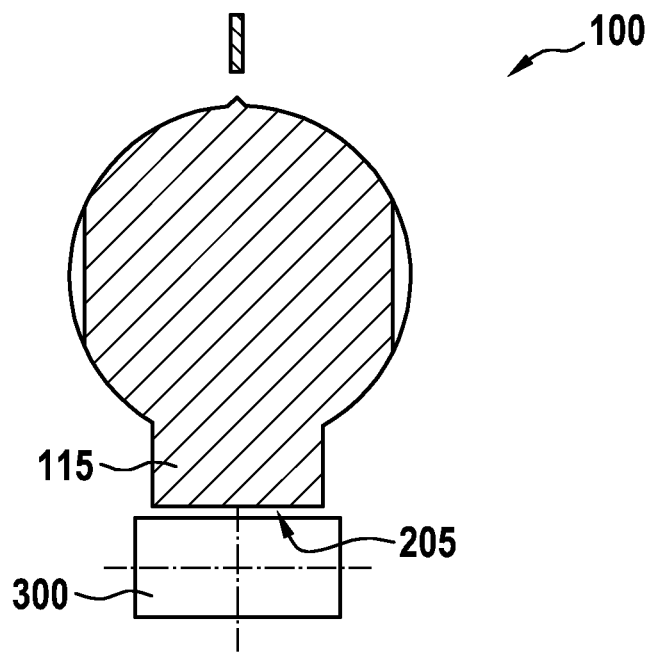

FIG. 2 shows a frontal cross-sectional representation of a rotational speed sensor 100 according to an exemplary embodiment. This may be an exemplary embodiment of the rotational speed sensor 100 described on the basis of FIG. 1, which is shown sectioned along the axis A-A shown in FIG. 1. The rotational speed sensor 100 is shown rotated by 90° to the observer compared to the rotational speed sensor 100 shown in FIG. 1.

It can be seen in FIG. 2 that the tongue 115 has two side surfaces 200, which extend parallel to each other according to this exemplary embodiment. An end surface 205 of the tongue connects the side surfaces 200 to each other and forms an outermost end of the tongue 115. The end surface 205 is convex shaped according to this exemplary embodiment. According to an alternative exemplary embodiment, the end surface 205 is concave or perpendicularly oriented with respect to the side surfaces 200. FIG. 2 also shows key surfaces 210.

Two further side surfaces of the tongue 115, which are oriented transversely to the side surfaces 200 and connect them to each other, can optionally be used to effect fixing of the rotational speed sensor 100 along the longitudinal axis of the rotational speed sensor 100.

FIG. 3a again shows the section plane A-A of a rotational speed sensor 100 and a fixing device 300 according to an exemplary embodiment. This can be the rotational speed sensor 100 described in FIG. 2.

The fixing device 300 is formed to position the rotational speed sensor 100 in a rotationally locked manner. For this purpose, the fixing device 300 has a counter-contour, which can be coupled to the tongue of the rotational speed sensor 100. According to this exemplary embodiment, the counter-contour forms at least one counter stop surface for the tongue 115. According to this exemplary embodiment, the fixing device 300 comprises two fixing elements 305, each of which forms a counter stop surface for the tongue 115. The fixing elements 305 are formed in a rod shape and/or extend transversely to an extension direction of the tongue 115 and/or are arranged adjacent to each of the side surfaces 200 or end surfaces 205 of the tongue 115. The rod-shaped fixing elements 305 according to this exemplary embodiment are cylindrical only by way of example. According to this exemplary embodiment, the tongue 115 is thus arranged between the two fixing elements 305. The side surfaces 200 of the tongue 115 form stop surfaces for the counter-contours. Alternatively, the fixing elements 305 may have another suitable form.

The fixing device 300 can also be referred to as a "fixing element for the rotational correct alignment of a sensor". According to an alternative exemplary embodiment, the fixing device 300 or at least one or both of the fixing elements 305 is formed as a screw stop, a bolt or a tab or directly as part of the receiving device for the sensor.

According to this exemplary embodiment, a further direction indicator 310 is arranged on an installation device for installing the rotational speed sensor 100 in a receiving device for mounting the rotational speed sensor 100, wherein the further direction indicator 310 allows the alignment of the rotational speed sensor 100. The receiving device is described in more detail in FIGS. 7 to 12.

FIG. 3b again shows the section plane A-A of a rotational speed sensor 100 and a fixing device 300 according to an exemplary embodiment. This can be the rotational speed sensor 100 described in FIG. 2.

Here, the tongue end surface 205, as described based on FIG. 1, is formed perpendicularly and extends parallel to a stop surface of the fixing device 300, which serves as a counter-contour to the rotationally locked fixing. In this example, only a single surface is used for rotational locking. The larger the stop surface 205 with a counter-contour, the smaller the resulting angular error which is allowed by the fixing.

Figure 4:
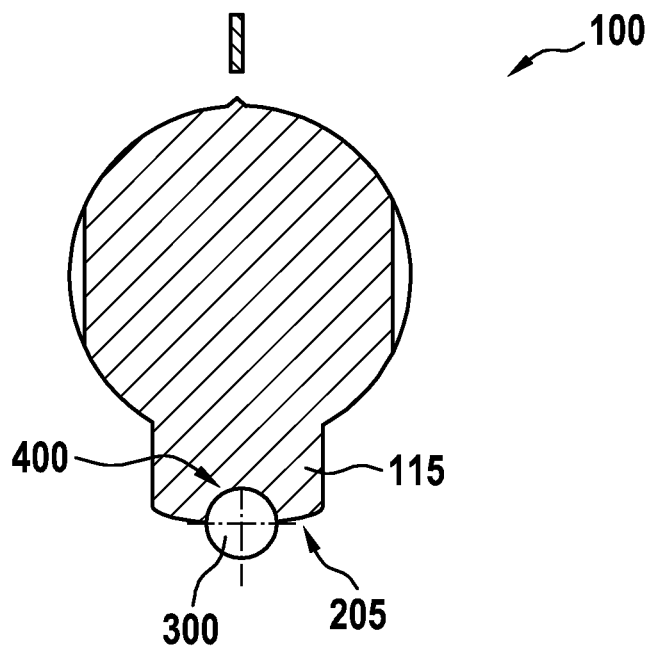
FIGS. 4 to 5 each show a rear cross-sectional representation of a rotational speed sensor and a fixing device according to an exemplary embodiment.

FIG. 4 shows a cross-sectional representation A-A from FIG. 1 of a rotational speed sensor 100 and a fixing device 300 according to an exemplary embodiment. This can be the rotational speed sensor 100 described in FIG. 2 or 3, with the difference that the end surface 205 of the tongue 115 has a tongue groove 400. The fixing device 300 may comprise only one of the fixing elements described in FIG. 3, which according to this exemplary embodiment is partially received in the tongue groove 400. As a counter-contour for the tongue 115, the fixing element forms a protrusion which engages in the tongue groove 400. According to this exemplary embodiment, the tongue groove 400 is arranged in the end surface 205 centrally and/or in a semi-circular manner. According to this exemplary embodiment, the tongue groove 400 serves as a stop surface for the counter-contour of the fixing device 300.

Figure 5:
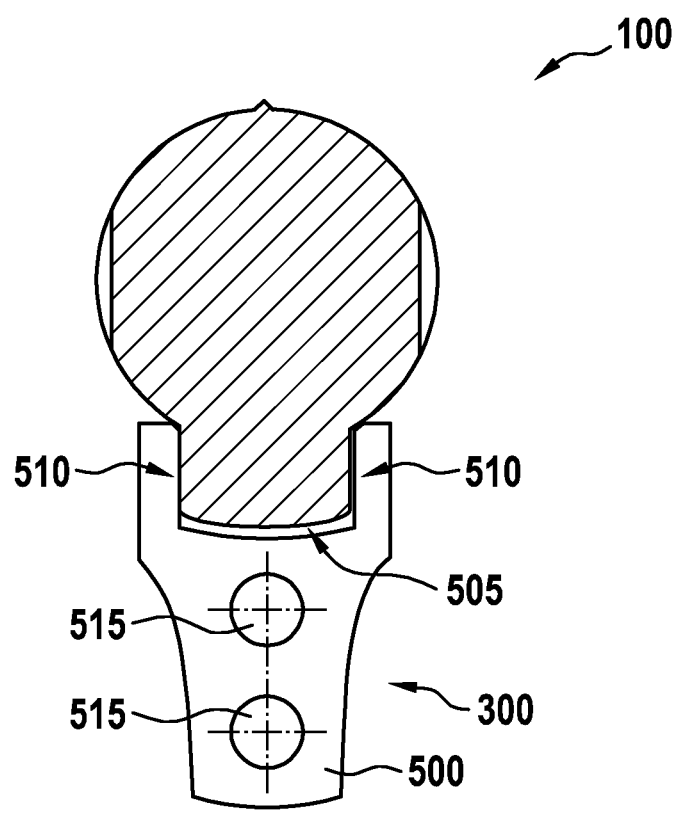

FIG. 5 shows a cross-sectional representation A-A from FIG. 1 of a rotational speed sensor 100 and a fixing device 300 according to an exemplary embodiment. This can be the rotational speed sensor 100 described in FIG. 2. According to this exemplary embodiment, the fixing device 300 has a bearing body 500 with a counter-contour in the form of a receiving groove 505, which is formed to receive the tongue. According to this exemplary embodiment, two mutually facing inner groove surfaces 510 of the receiving groove 505 each form a counter-stop surface for the side surfaces of the tongue arranged in the receiving groove 505.

According to this exemplary embodiment, the bearing body 500 has one or two through holes, here bores 515 for example, for receiving at least one screw or a rod. According to this exemplary embodiment, the two bores 515 according to this exemplary embodiment are arranged one below the other, i.e. one after the other on an extension of a depth of the receiving groove 505. According to this exemplary embodiment, the bores 515 each extend transversely to the depth of the receiving groove 505 and parallel to the longitudinal axis of the rotational speed sensor 100.

Figure 7:
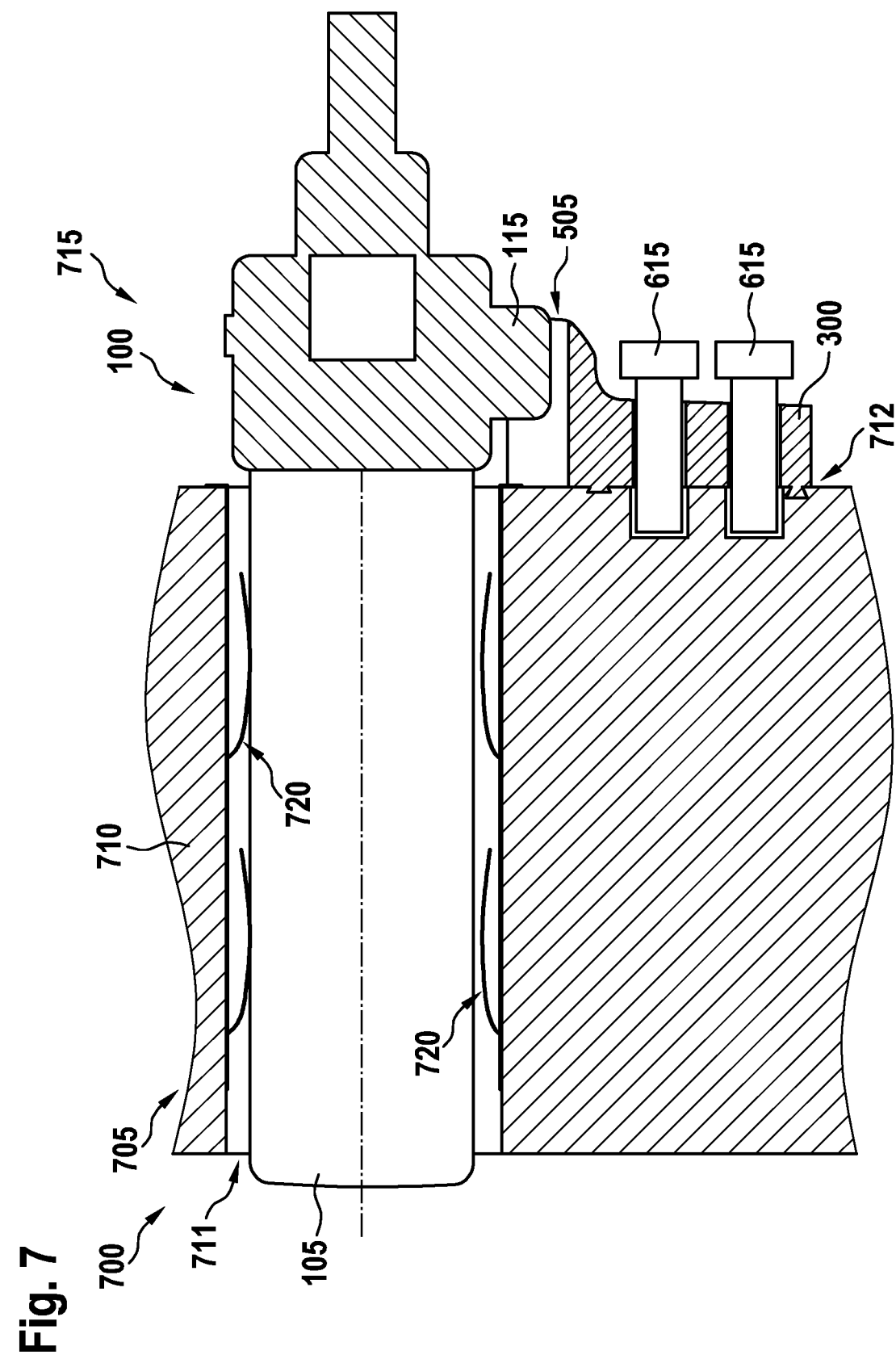
FIG. 7 shows a lateral cross-sectional representation of a sensor system with a receiving device with a fixing device and a rotational speed sensor according to an exemplary embodiment.

According to an exemplary embodiment, a fastening element is passed through each of the bores 515, by which the fixing device 300 can be attached, for example, to a fixed machine part, as shown in FIG. 7.

Figure 6:
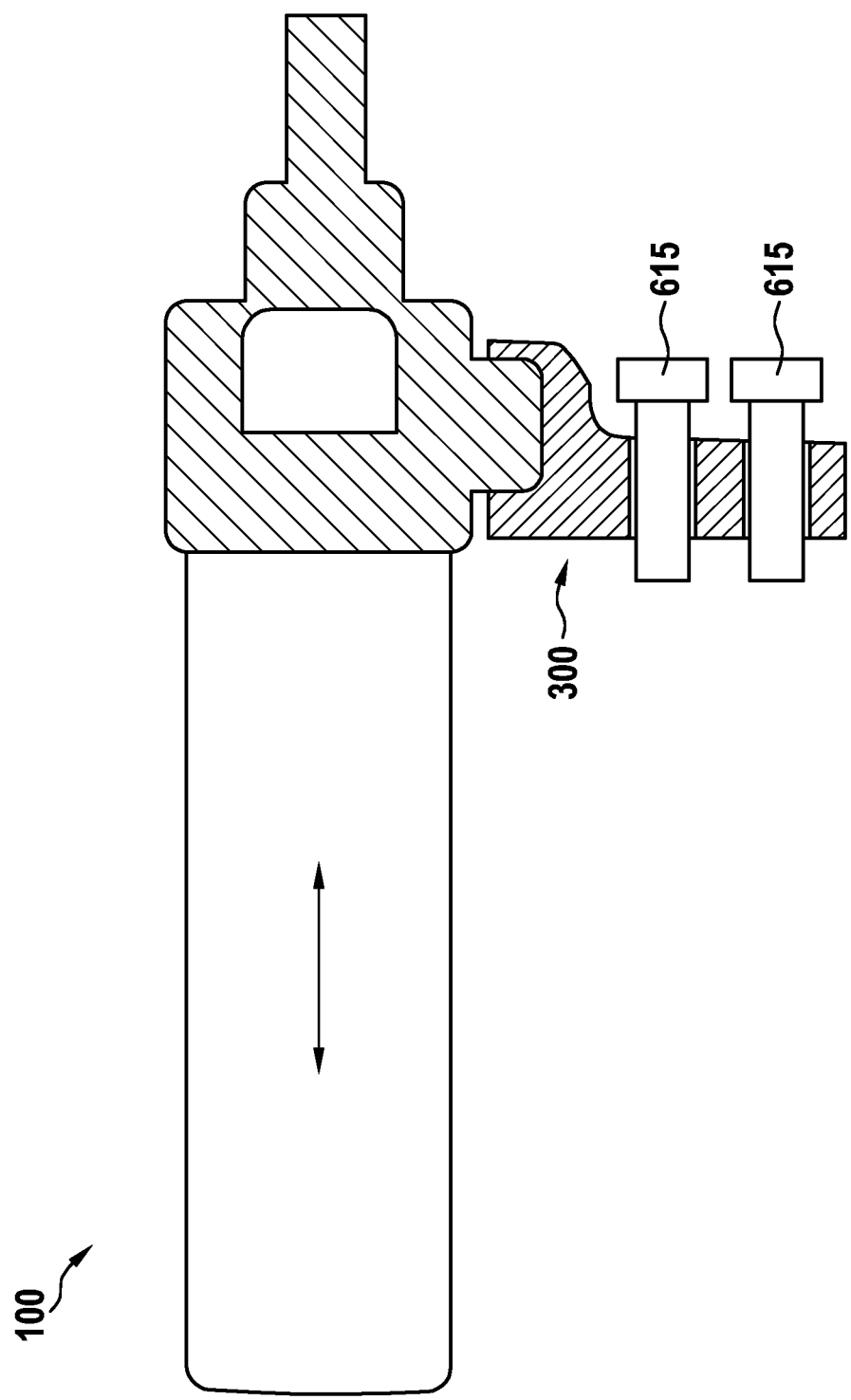
FIG. 6 shows a lateral cross-sectional representation of a rotational speed sensor with a fixing device according to an exemplary embodiment.

FIG. 6 shows a lateral cross-sectional representation of a rotational speed sensor 100 with a fixing device 300 according to an exemplary embodiment. This can be the rotational speed sensor 100 and the fixing device 300 described in FIG. 5. The fastening elements 615 passed through the bores are two screws according to this exemplary embodiment. Even if the rotational speed sensor 100 is mounted in the fixing device 300 in a rotationally locked manner, it can still be moved in the axial direction, i.e. along its longitudinal axis.

FIG. 7 shows a lateral cross-sectional representation of a sensor system 700 with a receiving device 705 with a fixing device 300 and a rotational speed sensor 100 according to an exemplary embodiment. The fixing device 300 can be the fixing device 300 described in FIG. 6 and the rotational speed sensor 100 can be the rotational speed sensor 100 described in FIG. 6. The sensor system 700 comprises the receiving device 705 and the rotational speed sensor 100. The receiving device 705 again has a receiving body 710, which is formed to accommodate at least a section of the sensor head 105, and the fixing device 300. According to this exemplary embodiment, the receiving body 710 has a cylindrical receiving bore 711 in which the cylindrical base body of the sensor head 105 is at least partially received by a clamping sleeve 720. The receiving body 710 and the fixing device 300 may be connected to each other in a form-fitting, force-fitting and/or firmly bonded manner. According to this exemplary embodiment, there is a form-fitting and additionally force-fitting connection. For this purpose, the fastening elements 615 of the fixing device 300 implemented as bolts are arranged screwed through the holes in the fixing device 300 into the receiving body 710. In addition, the fixing device 300 and the receiving body 710 are locked together by a locking device 712. The locking device 712 comprises suitable interlocking contours, which are formed on mutually opposing surfaces of the fixing device 300 and the receiving body 710. For example, the fixing device 300 has one or more protrusions and the receiving body 710 has one or more corresponding slots, or vice versa.

The rotational speed sensor 100 is arranged to be linearly movable parallel to its longitudinal axis in the cylindrical bore of the receiving body 710 with the help of the clamping sleeve 720. The clamping sleeve 720 is arranged in a circumferential gap between the sensor head 105 and the wall of the receiving bore 711. The clamping sleeve 720 may have one or more spring elements, which are supported on the circumferential wall of the receiving bore 711 and which van press against the sensor head 105 to keep the sensor head 105 linearly movable in the receiving bore 711.

In a received position 715 of the rotational speed sensor 100 in the receiving body 710 shown here, the tongue 115 and thus the entire rotational speed sensor 100 is coupled in a rotationally locked manner to the counter-contour of the fixing device 300 formed by the receiving groove 505. According to this exemplary embodiment, the receiving groove 505 is formed continuously over an entire length of the fixing device 300 in the longitudinal direction of the rotational speed sensor 100. In this way, the rotational speed sensor 100 can be moved freely in the longitudinal direction.

According to this exemplary embodiment, the sensor implemented here as a rotational speed sensor 100 is rotationally fixed by the fixing device 300 in the form of a further component and is installed correctly in the existing receiving body 710 in the form of an axle, which further makes it possible to move the rotational speed sensor 100 in the axial direction. According to this exemplary embodiment, only bores/threads for the fixing device 300 in the form of a fixing plate are applied to the receiving body 710 at an outer wall of the receiving body 710 parallel to the receiving bore 711. According to an alternative exemplary embodiment, the fixing device 300 is cast in the form of a fixing contour directly on the receiving body 710. Thus, no further fixing component such as one or more screws is required.

According to an exemplary embodiment, the bearing body may be a stamped and bent part. In addition to or as an alternative to the screws shown here and/or the locking device 712, the fixing device 300 according to an alternative exemplary embodiment comprises at least a tongue and groove joint and/or groove and groove joint and/or a rivet.

According to an alternative exemplary embodiment, the fixing device 300 may be one of the fixing devices 300 described on the basis of one of FIGS. 3 to 5, which is connected to the receiving body 710 in one piece or in a form-fitting, firmly bonded and/or force-fitting manner.

Figure 8:
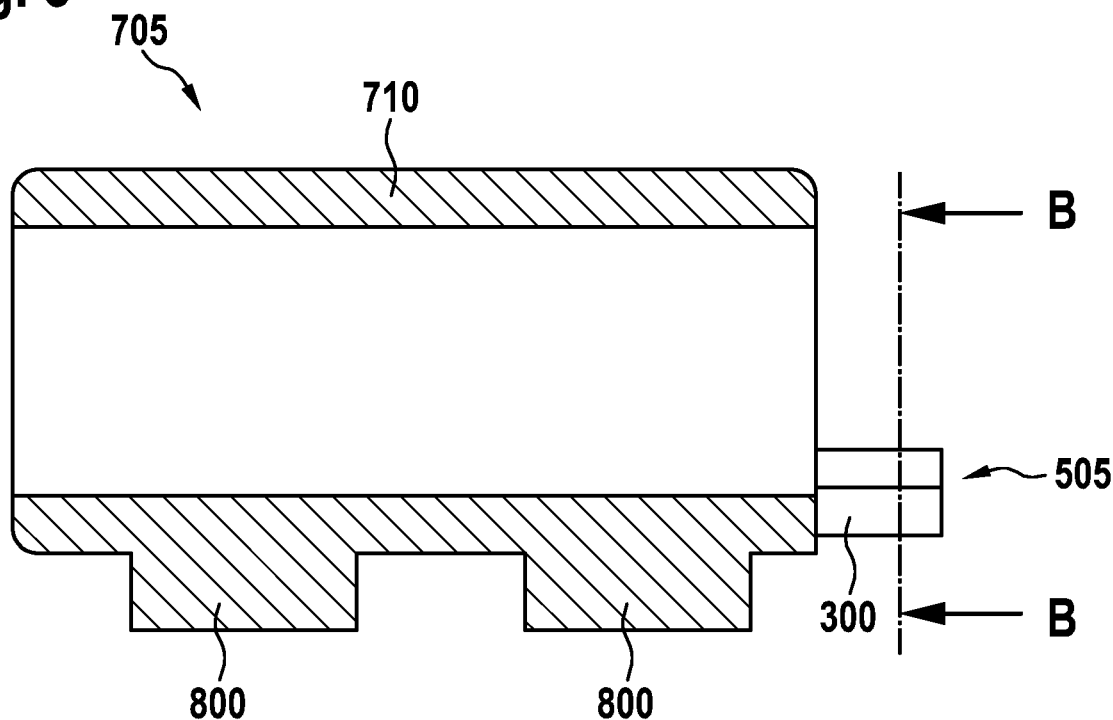
FIG. 8 shows a lateral cross-sectional representation of a receiving device according to an exemplary embodiment.

FIG. 8 shows a lateral cross-sectional representation of a receiving device 705 according to an exemplary embodiment. This may be the receiving device 705 described in FIG. 7, with the difference that the fixing device 300 is formed as an extension of the receiving device 705. The fixing device 300 forms a receiving groove 505 as described in FIG. 7. According to an alternative exemplary embodiment, the fixing device 300 is formed by two, for example rod-shaped fixing elements 305, as described on the basis of FIG. 3, for example.

The receiving body 710 and the fixing device 300 are formed in one piece according to this exemplary embodiment. According to this exemplary embodiment, an external diameter of the receiving body 710 has one or more tabs 800, which are formed, for example, to mount the receiving device 705 on a truck or trailer.

According to this exemplary embodiment, the fixing device 300 in the form of an anti-rotation lock is attached directly to the receiving body 710 in the form of a holder, as is often used in trailers. The fixing device 300 realizes an extension of a receiving body 710 in the form of an installation device with a fixing element for positionally correct installation of the sensor. The receiving body 710 is formed according to this exemplary embodiment as a pipe with welding tabs or screw tabs 800 as a sensor holder on a trailer or a truck, for example. According to an alternative embodiment, the receiving body 710 has a recess and/or a clamping sleeve for guiding the sensor directly in the tube. As a further advantageous exemplary embodiment, the receiving device 705 comprises a device for a stamped bent part for fixing.

FIG. 8 also shows a section axis B-B.

Figure 9:
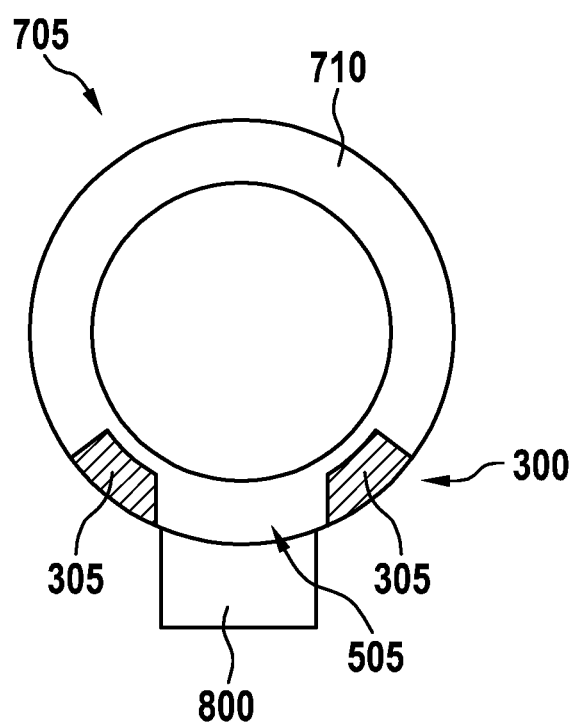
FIG. 9 shows a frontal cross-sectional representation of a receiving device according to an exemplary embodiment (section B-B of FIG. 8).

FIG. 9 shows a frontal cross-sectional representation of a receiving device 705 according to an exemplary embodiment. This may be an embodiment of the receiving device 705 described on the basis of FIG. 8, which is shown sectioned along the section axis B-B shown in FIG. 8. The section thus runs through the fixing device 300.

The receiving device 705 is shown rotated by 90° to the observer relative to the receiving device 705 shown in FIG. 8. It can be seen in FIG. 9 that two opposing fixing elements 305 are formed by the receiving groove 505, which according to this exemplary embodiment each have the shape of an annular segment in cross-section by way of example. Two mutually facing inner surfaces of the fixing elements 305 run parallel to each other according to this exemplary embodiment and form groove inner surfaces which serve as stop surfaces for side surfaces of the tongue of the rotational speed sensor 100.

Figure 10:
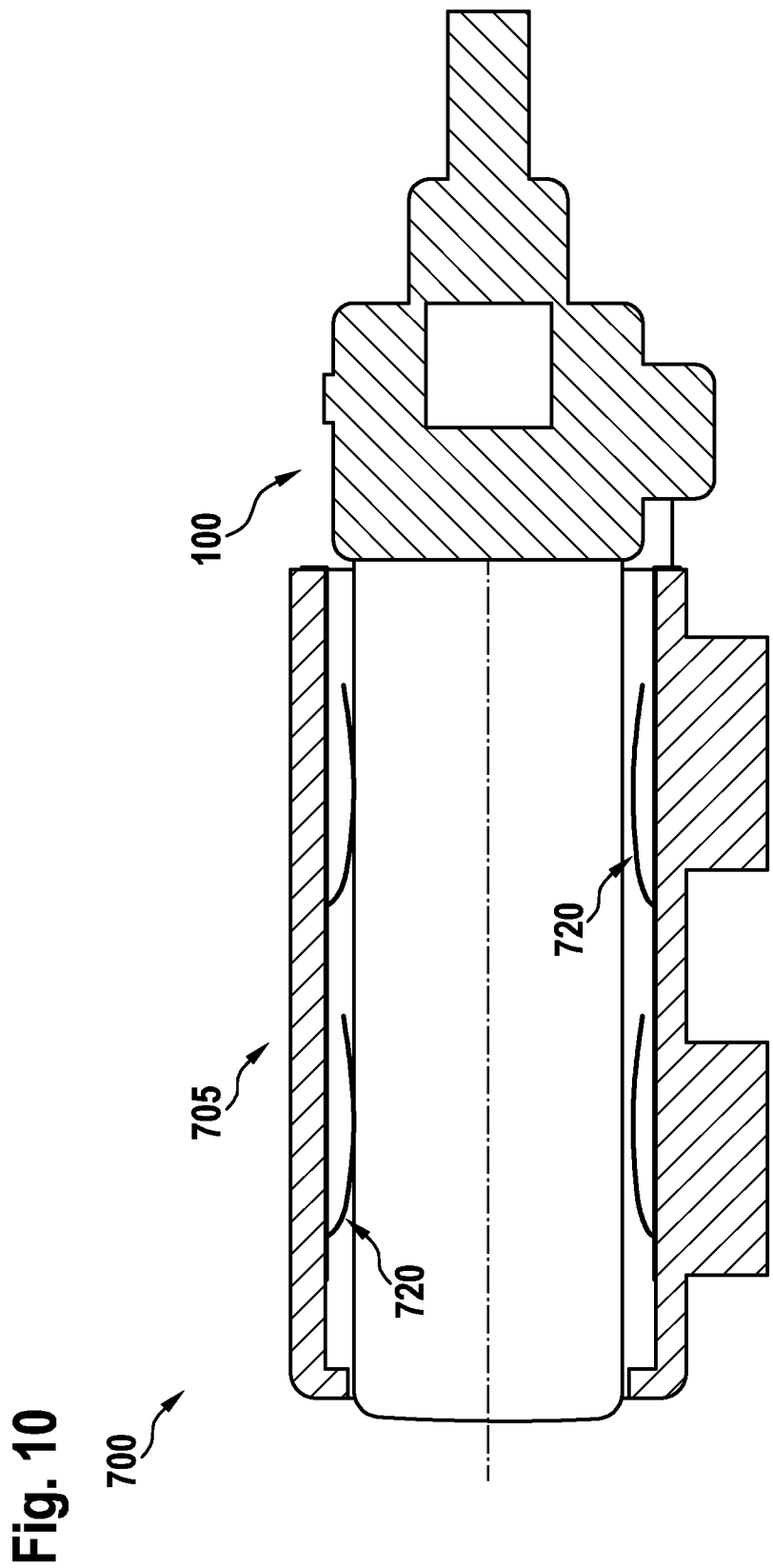
FIGS. 10 and 11 each show a lateral cross-sectional representation of a sensor system according to an exemplary embodiment.

FIG. 10 shows a lateral cross-sectional representation of a sensor system 700 according to an exemplary embodiment. This can be the sensor system 700 described in FIG. 7, with the difference that the receiving device 705 corresponds to the receiving device 705 described in FIG. 8 or 9. The rotational speed sensor 100 is arranged in the receiving position in the receiving device 705 and is mounted in a rotationally locked manner but linearly movably by the fixing device.

Figure 11:
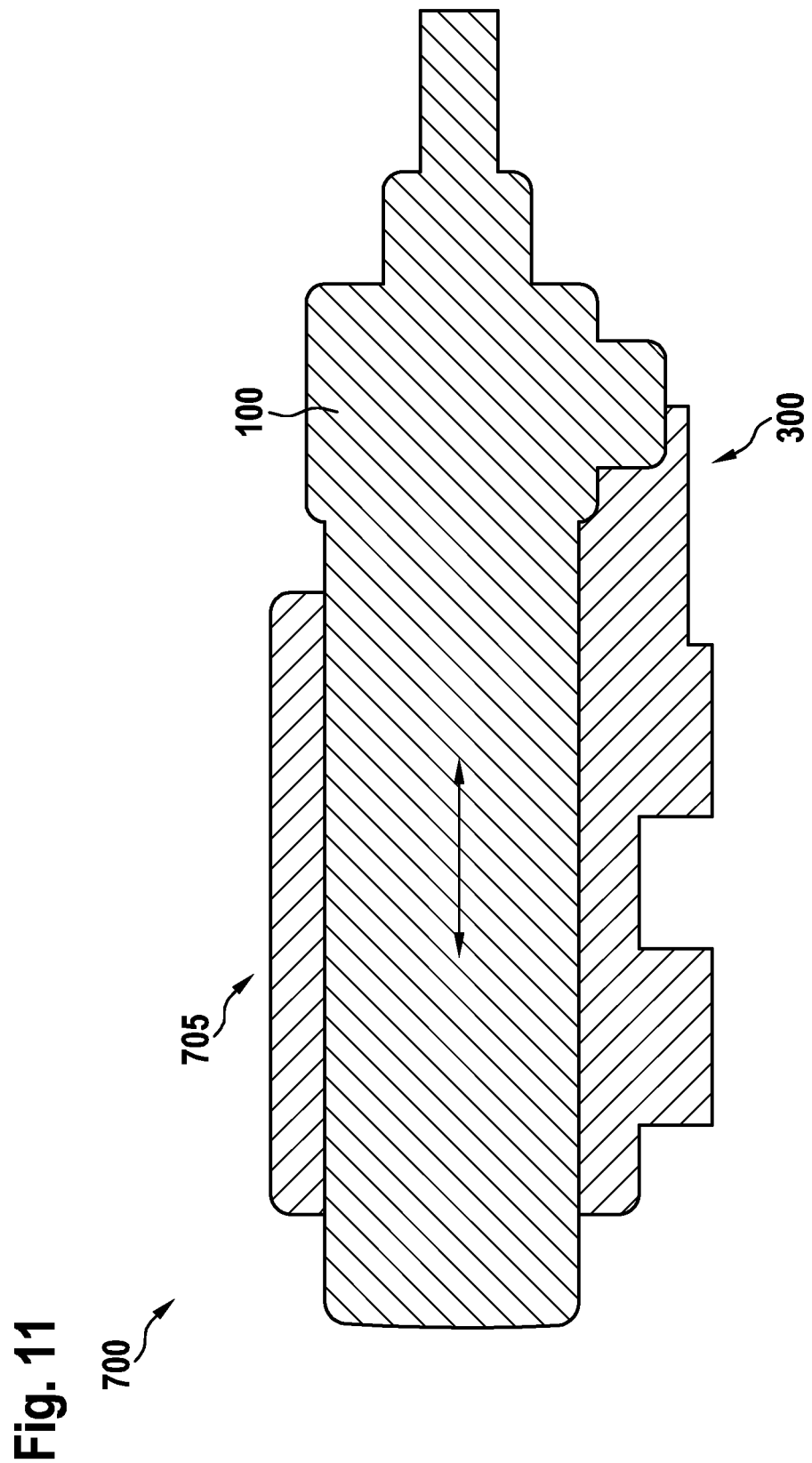

FIG. 11 shows a lateral cross-sectional representation of a sensor system 700 according to an exemplary embodiment. This can be the sensor system 700 described in FIG. 10. The rotational speed sensor 100 is formed in one piece according to this exemplary embodiment. The fixing device 300 is formed as an extension of the receiving device 705.

Figure 12:
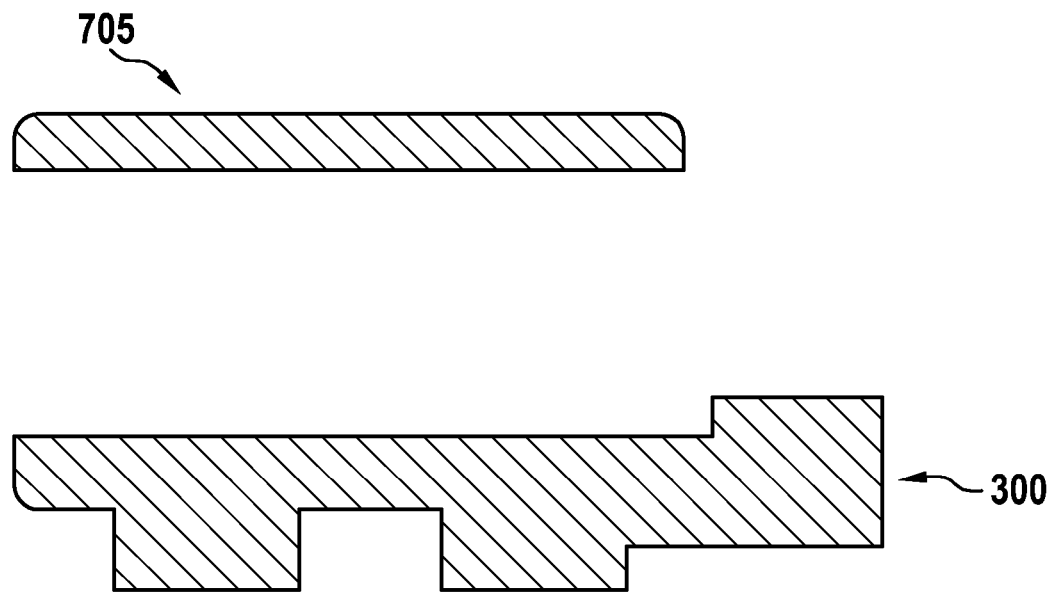
FIG. 12 shows a lateral cross-sectional representation of a receiving device according to an exemplary embodiment.

FIG. 12 shows a lateral cross-sectional representation of a receiving device 705 according to an exemplary embodiment. This can be the receiving device 705 described in FIG. 11. The fixing device 300 can be one of the fixing devices 300 described on the basis of one of FIGS. 3 to 11, which is connected to the receiving body in one piece or in a form-fitting, firmly bonded and/or force-fitting manner.

Figure 13:
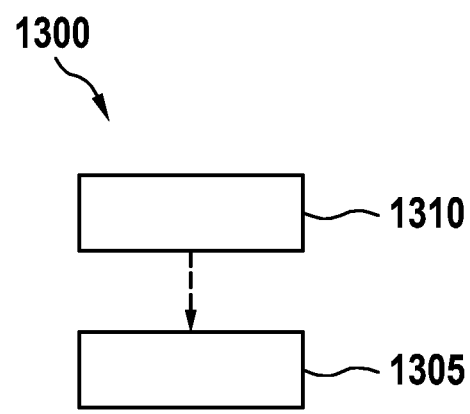
FIG. 13 shows a flow diagram of a method for rotationally locked positioning of a rotational speed sensor on a fixing device according to an exemplary embodiment.

FIG. 13 shows a flow diagram of a method 1300 for the rotationally locked positioning of a rotational speed sensor on a fixing device according to an exemplary embodiment. This can be one of the rotational speed sensors described in one of FIGS. 1 to 12 and one of the fixing devices described in one of FIGS. 3 to 12.

The method 1300 has an arranging step 1305 in which the tongue of the rotational speed sensor is arranged in or on a counter-contour of a fixing device, wherein in the arranging step 1305 the tongue is arranged in such a way that it interacts with the counter-contour, for example it grips in or on the counter-contour to position the rotational speed sensor in a rotationally locked manner.

Optionally, the method 1300 has a providing step 1310 before the arranging step 1305, wherein the rotational speed sensor and fixing device are provided in the providing step 1310.

If an exemplary embodiment comprises an "and/or" link between a first feature and a second feature, this is to be read in such a way that according to one implementation the exemplary embodiment has both the first feature and the second feature and according to a further implementation the exemplary embodiment has either only the first feature or only the second feature.

THE REFERENCE CHARACTER LIST IS AS FOLLOWS

100 Rotational speed sensor
105 Sensor head
110 Measuring tip
115 Tongue
120 External diameter
125 Rotor
130 First component
135 Second component
140 Cylinder center axis
145 Direction indicator
150 Cable outlet
200 Side surface
205 End surface
210 Key surface
300 Fixing device
305 Fixing element
310 Further directional indicator
400 Tongue groove
500 Bearing body
505 Receiving groove
510 Groove inner surface
515 Bores
615 Fastening element
700 Sensor system
705 Receiving device
710 Receiving body
711 Receiving bore
712 Locking device
715 Receiving position
720 Clamping sleeve
800 Tab
1300 Method for rotationally locked positioning of a rotational speed sensor on a fixing device
1305 Arranging step
1310 Providing step

The invention claimed is:

1. A rotational speed sensor, comprising:
a cylindrical sensor head having a measuring tip; and
a tongue, which is arranged on an outer diameter of the sensor head, and which is formed to interact with a counter-contour of a fixing device as a rotational lock for the rotational speed sensor;
wherein the tongue of the rotational speed sensor is couple-able to the counter contour in a rotationally locked manner, and
wherein an end surface of the tongue forms a flat stop surface for the counter contour, wherein the end surface forms an outermost free end of the tongue and is arranged to run transversely to the side surfaces of the tongue and connects them, wherein the flat stop surface serves as a single surface for providing rotationally fixed locking.

2. The rotational speed sensor of claim 1, wherein the tongue is formed to grip in or on the counter-contour of a fixing device.

3. The rotational speed sensor of claim 1, wherein the tongue extends radially away from the sensor head.

4. The rotational speed sensor of claim 1, wherein two side surfaces of the tongue form stop surfaces for the counter-contour.

5. The rotational speed sensor of claim 1, wherein the tongue is arranged at an end of the sensor head facing away from the measuring tip.

6. The rotational speed sensor of claim 1, wherein an end surface of the tongue has a tongue groove as a stop surface for the counter-contour.

7. The rotational speed sensor of claim 1, wherein an end surface of the tongue forms a flat stop surface for the counter-contour.

8. A fixing device for a rotational speed sensor, comprising:
- a counter-contour, which is couple-able to a tongue of the rotational speed sensor to position the rotational speed sensor in a rotationally locked manner;
- wherein the rotational speed sensor includes:
  - a cylindrical sensor head having a measuring tip; and
  - the tongue, which is arranged on an outer diameter of the sensor head, and which is formed to interact with the counter-contour of the fixing device as a rotational lock for the rotational speed sensor;
  - wherein the tongue of the rotational speed sensor is couple-able to the counter contour in a rotationally locked manner, and
  - wherein an end surface of the tongue forms a flat stop surface for the counter contour, wherein the end surface forms an outermost free end of the tongue and is arranged to run transversely to the side surfaces of the tongue and connects them, wherein the flat stop surface serves as a single surface for providing rotationally fixed locking.

9. The fixing device of claim 8, wherein the counter-contour forms a receiving groove for receiving the tongue or a protrusion for engaging in a tongue groove of the tongue or at least an extension as a counter stop surface for the tongue.

10. A receiving device, comprising:
- a receiving body for receiving at least one section of a rotational speed sensor head and a fixing device;
- wherein the fixing device, for the rotational speed sensor, includes a counter-contour, which is couple-able to a tongue of the rotational speed sensor to position the rotational speed sensor in a rotationally locked manner, and
- wherein the rotational speed sensor includes:
  - a cylindrical sensor head having a measuring tip; and
  - the tongue, which is arranged on an outer diameter of the sensor head, and which is formed to interact with the counter-contour of the fixing device as a rotational lock for the rotational speed sensor;
  - wherein the tongue of the rotational speed sensor is couple-able to the counter contour in a rotationally locked manner, and
  - wherein an end surface of the tongue forms a flat stop surface for the counter contour, wherein the end surface forms an outermost free end of the tongue and is arranged to run transversely to the side surfaces of the tongue and connects them, wherein the flat stop surface serves as a single surface for providing rotationally fixed locking.

11. The receiving device of claim 10, wherein the receiving body and the fixing device are formed in one piece or the fixing device is connected to the receiving body in a form-fitting, force-fitting and/or firmly bonded manner.

12. A sensor system, comprising:
- a receiving device;
- a rotational speed sensor;
- wherein the tongue of the rotational speed sensor is couple-able to the counter-contour in a rotationally locked manner,
- wherein the receiving device includes a receiving body for receiving at least one section of a rotational speed sensor head and a fixing device,
- wherein the fixing device, for the rotational speed sensor, includes a counter-contour, which is couple-able to a tongue of the rotational speed sensor to position the rotational speed sensor in a rotationally locked manner, and
- wherein the rotational speed sensor includes:
  - a cylindrical sensor head having a measuring tip; and
  - the tongue, which is arranged on an outer diameter of the sensor head, and which is formed to interact with the counter-contour of the fixing device as a rotational lock for the rotational speed sensor;
  - wherein the tongue of the rotational speed sensor is couple-able to the counter contour in a rotationally locked manner, and
  - wherein an end surface of the tongue forms a flat stop surface for the counter contour, wherein the end surface forms an outermost free end of the tongue and is arranged to run transversely to the side surfaces of the tongue and connects them, wherein the flat stop surface serves as a single surface for providing rotationally fixed locking.

13. A method for providing a rotationally locked positioning of a rotational speed sensor on a fixing device, the method comprising:
- arranging a tongue of the rotational speed sensor in or on a counter-contour of a fixing device, wherein in the arranging, the tongue is arranged so that it interacts with a counter-contour to position the rotational speed sensor in a rotationally locked manner;
- wherein the fixing device includes a counter-contour, which is couple-able to a tongue of the rotational speed sensor to position the rotational speed sensor in a rotationally locked manner, and
- wherein the rotational speed sensor includes:
  - a cylindrical sensor head having a measuring tip; and
  - the tongue, which is arranged on an outer diameter of the sensor head, and which is formed to interact with the counter-contour of the fixing device as a rotational lock for the rotational speed sensor;
  - wherein the tongue of the rotational speed sensor is couple-able to the counter contour in a rotationally locked manner, and
  - wherein an end surface of the tongue forms a flat stop surface for the counter contour, wherein the end surface forms an outermost free end of the tongue and is arranged to run transversely to the side surfaces of the tongue and connects them, wherein the flat stop surface serves as a single surface for providing rotationally fixed locking.

14. A rotational speed sensor, comprising:
- a cylindrical sensor head having a measuring tip; and
- a tongue, which is arranged on an outer diameter of the sensor head, and which is formed to interact with a counter-contour of a fixing device as a rotational lock for the rotational speed sensor;
- wherein the tongue of the rotational speed sensor is couple-able to the counter contour in a rotationally locked manner,
- wherein the counter-contour forms counter-stop surfaces of the tongue, wherein the fixing device includes two fixing elements, each of which forms one of the counter-stop surfaces of the tongue, and
- wherein the tongue is arranged between the two fixing elements, and wherein the side surfaces of the tongue form stop surfaces for the counter-contours.

15. The rotational speed sensor of claim 14, wherein each of the fixing elements is formed in a rod shape and/or extends transversely to an extension direction of the tongue and/or is arranged adjacent to each side surface or end surface of the tongue.

16. The rotational speed sensor of claim 15, wherein each of the rod-shaped fixing elements is cylindrical.

\* \* \* \* \*